United States Patent
Zhu et al.

(10) Patent No.: US 9,655,006 B2
(45) Date of Patent: May 16, 2017

(54) SYSTEM AND METHOD FOR CONTROLLING CONGESTION IN WIRELESS MESH NETWORKS

(75) Inventors: Chunhui Zhu, San Jose, CA (US); Myung-Jong Lee, New York, NY (US); Jun-Seo Lee, Seoul (KR); Rakesh Taori, Suwon-si (KR); Sung-Won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2291 days.

(21) Appl. No.: 11/445,192

(22) Filed: Jun. 2, 2006

(65) Prior Publication Data
US 2006/0274680 A1 Dec. 7, 2006

Related U.S. Application Data (60) Provisional application No. 60/686,459, filed on Jun. 2, 2005.

(30) Foreign Application Priority Data

May 16, 2006 (KR) .................................. 43798-2006

(51) Int. Cl.
*H04W 28/10* (2009.01)
*H04W 74/08* (2009.01)
*H04W 84/18* (2009.01)

(52) U.S. Cl.
CPC ............ *H04W 28/10* (2013.01); *H04W 74/08* (2013.01); *H04W 84/18* (2013.01)

(58) Field of Classification Search
USPC ....................... 370/348, 465; 455/63.1, 67.11
See application file for complete search history.

(56) References Cited

U.S. PATENT DOCUMENTS

| 5,844,905 A | 12/1998 | McKay et al. ................. 370/443 |
| 6,674,721 B1 | 1/2004 | Dittia et al. .................. 370/235 |
| 6,728,211 B1 | 4/2004 | Peris et al. ..................... 370/235 |

(Continued)

FOREIGN PATENT DOCUMENTS

KR    10-2005-0067321 A    7/2005

OTHER PUBLICATIONS

802.11-1999, "Part 11: Wireless LAN Medium Access Control (MAC) and Physical Layer (PHY) Specifications", Jun. 12, 2003, all pages.*

*Primary Examiner* — Kwang B Yao
*Assistant Examiner* — Adam Duda
(74) *Attorney, Agent, or Firm* — NSIP Law (57) ABSTRACT

A system and method for controlling congestion using Request-to-Send (RTS) and Clear-to-Send (CTS) in a wireless mesh network are provided. A receiver in a congestion state sets a duration field value of congestion control in a CTS frame and transmits the CTS frame to a sender. In response, the sender retransmits an RTS frame to the receiver without transmitting data, after waiting for an RTS retransmission waiting time period corresponding to the duration field value. The congestion state information is broadcast to neighboring nodes. Therefore, the congestion control system using the CTS frame does not use a separate frame for the congestion control. And, all of the neighboring nodes can participate in the congestion control, increasing the network efficiency.

8 Claims, 8 Drawing Sheets

(56) References Cited

U.S. PATENT DOCUMENTS

| | | | |
|---|---|---|---|
| 6,765,870 B2 | 7/2004 | Chintada et al. | 370/230 |
| 2004/0229566 A1* | 11/2004 | Wang et al. | 455/63.1 |
| 2005/0089005 A1 | 4/2005 | Sakoda et al. | |
| 2005/0141476 A1* | 6/2005 | Choi et al. | 370/348 |

* cited by examiner

Duration Field (220)

| Bit 15 | Bit 14~0 | Usage |
|---|---|---|
| 0 | 0 -32767 | Value set for congestion control |

FIG.2C

Duration Field (220)

| Bit 15 | Bit 14 | Bit 13~0 | Usage |
|---|---|---|---|
| 0 | 0/1 | -16384 ~ 16384 | Value set for congestion control |

SYSTEM AND METHOD FOR CONTROLLING CONGESTION IN WIRELESS MESH NETWORKS

PRIORITY

This application claims the benefit under 35 U.S.C. §119 to an application Ser. No. 60/686,459 filed in the United States Patent and Trademark Office on Jun. 2, 2005 and an application Serial No. 2006-43798 filed in the Korean Intellectual Property Office on May 16, 2006, the entire disclosures of both of which are hereby incorporated by reference.

BACKGROUND OF THE INVENTION

1. Field of the Invention

The present invention relates generally to a system and method for controlling congestion in wireless mesh networks. More particularly, the present invention relates to a system and method for controlling congestion using Request-to-Send (RTS) and Clear-to-Send (CTS) in wireless mesh networks or Ad-Hoc networks.

2. Description of the Related Art

Conventional wireless networks have star topologies of Point-to-Point or Point-to-Multipoint. Recently, interest in the wireless networks with a Multipoint-to-Multipoint mesh topologies has increased.

In the wireless networks, congestion may occur at the node where an incoming rate of a packet is higher than an outgoing rate. The congestion is not a serious problem in the conventional one-hop or peer-to-peer networks. However, the multi-Hop mesh networks experience considerable problems resulting from the congestion.

The conventional methods for solving the congestion problem will now be described below.

A first conventional method uses an explicit congestion control message. According to this method, each node maintains a route depending on an outgoing rate and an incoming rate for its efficient medium access control. Each node also monitors a backpressure indicative of a difference between the outgoing rate and the incoming rate. The rate control aims to maintain the backpressure approaching 0 for a local node. If the backpressure is greater than 0, the congestion occurs. If congestion occurs, a downstream node (or receiver) transmits a Congestion Control Request (CCR) message indicating the congestion state to an upstream node (or sender). Upon receiving the message, the sender applies rate control to relieve the congestion around the receiver and transmits a Congestion Control Response message back to the receiver. The CCR/CCP messages can only regulate the packet incoming rate from the current sender. To avoid new neighbors sending packets to the congested receiver, the receiver has to send a Neighborhood Congestion Announcement message to all neighbors. However, this conventional method may also cause congestion by casting additional control messages to the node (receiver) where the congestion state has already occurred. In addition, the three added new frames reduce the efficiency of the network.

A second conventional method uses an Acknowledge Character (ACK) as a congestion notification. According to this method, if congestion occurs, a receiver transmits congestion notification information to a sender using an ACK frame. In response, the sender adjusts the packet transmission rate. However, in this conventional method, the ACK frame is transmitted only to the node that has transmitted data. Therefore, other nodes that have not transmitted data cannot receive the ACK frame. As a result, the receiver may receive data from neighboring nodes that did not to receive the ACK frame even in the congestion state. This will subsequently cause an increase in the congestion.

A third conventional method indicates the congestion using a beacon frame. According to this method, a node transmits a notification indicating its own congestion level to another node using a selected beacon frame. The neighboring nodes also transmit notifications indicating their own states using a selected beacon frame. Upon receiving the notification indicating the congestion level, each node adjusts its transmission rate. In this conventional method, time blanks may exist since the beacon frame is periodically transmitted. This is because when the congestion occurs, the congestion node cannot inform its neighbors until a next beacon time arrives. This results in further neglecting the congestion state until a transmission period of the beacon frame arrives. In addition, even though the congestion has been removed, this method can only announce it when the next beacon time arrives, making the network throughput inefficient. Moreover, the mesh network system, compared with the single-hop network, needs more complex scheduling in order to prevent beacon frames from colliding with each other.

As described above, the first conventional method using the explicit congestion control message casts additional control traffic to the congestion node, causing further congestion. The second conventional method uses an ACK as a congestion notification, thus causing an increase in the congestion. The third conventional method using the beacon frame for congestion indication cannot immediately cope with the congestion state, and has very complex scheduling.

Accordingly, there is a need for an improved system and method for providing congestion control for mesh networks, capable of increasing network efficiency, receiving congestion control from all nodes, and immediately coping with a congestion state.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a congestion control system and method for mesh networks, capable of increasing network efficiency, receiving congestion control from all nodes, and immediately coping with a congestion state.

According to one aspect of an exemplary embodiment of the present invention, a system for controlling congestion in a wireless mesh network is provided. The system comprises a receiver and a sender. The receiver sets a duration field value in a Clear-to-Send (CTS) frame and transmits the CTS frame to the sender. Upon receipt of the CTS frame from the receiver, the sender retransmits a Request-to-Send (RTS) frame to the receiver after waiting for an RTS frame retransmission waiting time period corresponding to the duration field value.

According to another aspect of an exemplary embodiment of the present invention, a method for controlling congestion by a receiver of a congestion control system in a wireless mesh network is provided. A Request-To-Send (RTS) frame is received from a sender. A duration field value of congestion control is set in a Clear-to-Send (CTS) frame upon receipt of the RTS frame in a congestion state and a CTS frame is set indicating data transmission upon receipt of the RTS frame in a non-congestion state. The CTS frame is transmitted with the duration field value written therein to the sender.

According to further another aspect of an exemplary embodiment of the present invention, a method for controlling congestion by a sender of a congestion control system in a wireless mesh network is provided. A Request-To-Send (RTS) frame is transmitted to a receiver. A Clear-to-Send (CTS) frame is received from the receiver. A RTS frame is retransmitted if RTS retransmission is indicated in the CTS frame after waiting for a RTS retransmission waiting time period corresponding to a duration field value.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention relate to a system and method for controlling congestion in wireless mesh networks, and more particularly to a system and method for controlling congestion using Request-to-Send (RTS) and Clear-to-Send (CTS) in wireless mesh networks (or Ad-Hoc networks). An exemplary embodiment of the present invention sets a congestion control duration field (hereinafter referred to as a "duration field" for short) value in a CTS frame. A sender transmits a RTS to the receiver. A receiver transmits the CTS frame to a sender. Upon receiving responses with the CTS frame, the sender analyzes the CTS frame, and does not transmit data. Instead, the sender waits for an RTS retransmission waiting time corresponding to the duration field value. Thereafter, the sender retransmits an RTS frame to the receiver. As a result, an exemplary embodiment of the present invention does not transmit actual data, but retransmits the RTS frame from the sender to the receiver, which is a congestion node. This ultimately controls the congestion.

According to a first exemplary embodiment of the present invention, a receiver sets a negative value in a duration field, and transmits the CTS frame to a sender, thereby rejecting the RTS. According to an exemplary implementation, rejecting the RTS indicates that the receiver decides not to receive actual data due to the congestion that has occurred. In a second exemplary embodiment of the present invention, a receiver sets a Negative Clear-To-Send (NCTS) frame indicating the next RTS frame retransmission time period. The receiver rejects the RTS by transmitting the NCTS frame to a sender. In a third exemplary embodiment of the present invention, a receiver sets a duration field value to '0' in a CTS frame. The receiver rejects the RTS by transmitting the CTS frame to a sender. In a fourth exemplary embodiment of the present invention, a receiver rejects the RTS by not transmitting the CTS frame.

Figure 1:
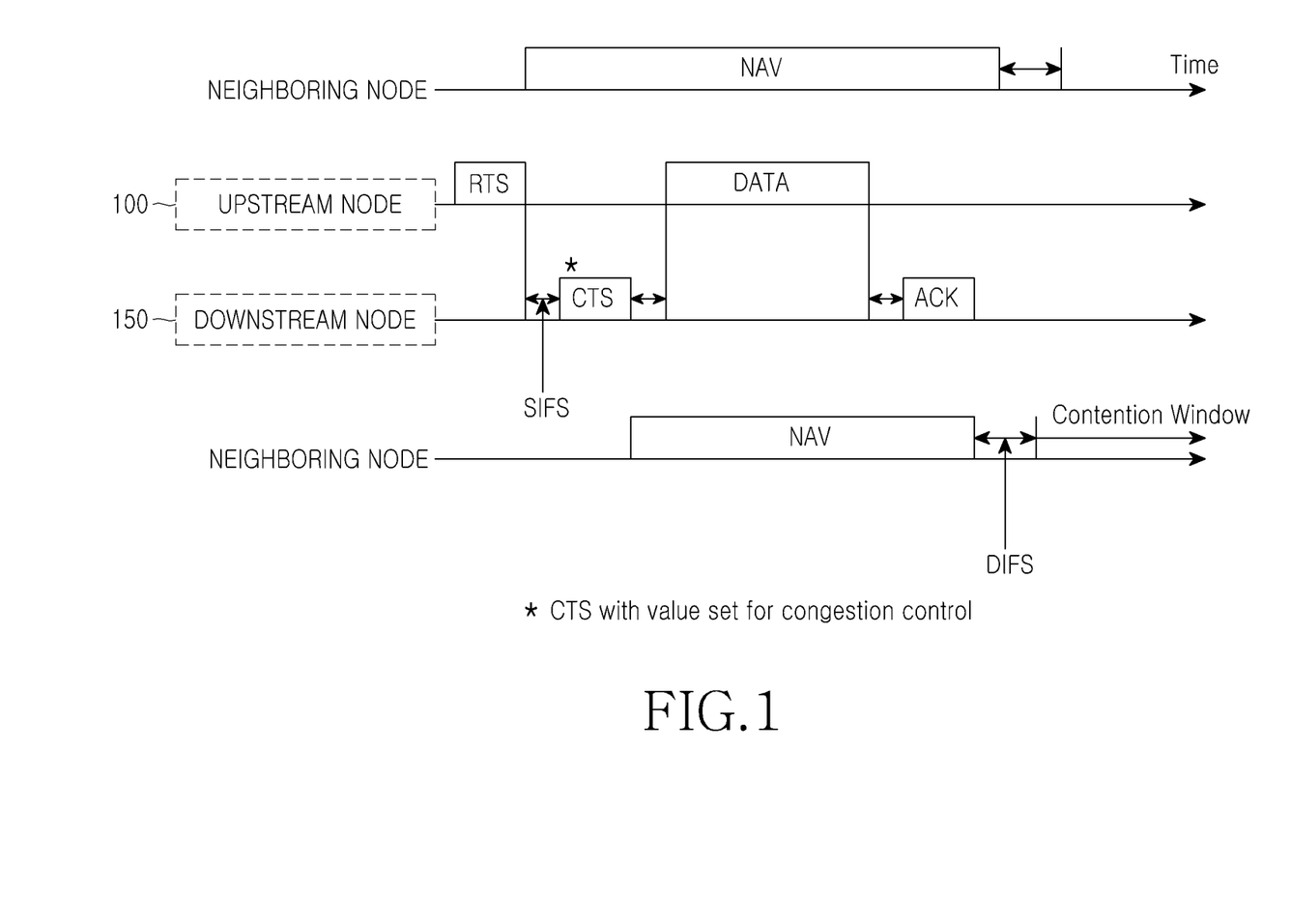
FIG. 1 is a diagram illustrating an exemplary process of transmitting data from a sender to a receiver according to an exemplary embodiment of the present invention.

With reference to FIG. 1, a description will now be made of a method for transmitting data in wireless mesh networks. FIG. 1 is a diagram illustrating an exemplary process of transmitting data from a sender to a receiver according to an exemplary embodiment of the present invention.

Referring to FIG. 1, if a sender (or upstream node) 100 first transmits an RTS frame to a receiver (or downstream node) 150, the receiver 150 transmits a CTS frame to the sender 100 in response thereto. At this moment, neighboring nodes are aware of channel usage and they can set their network allocation vectors (NAV). If the received CTS frame does not indicate a congestion state, the sender 100 transmits data to the receiver 150. In response thereto, the receiver 150 transmits an Acknowledge Character (ACK) to the sender 100.

If an incoming rate of packets at the receiver 150 is higher than the outgoing rate, a congestion state may occur. In this case, if the receiver 150 receives data, the congestion may increase. This results from data transmitted in the congestion state, causing data to pile up in the receiver 150. As a result, the buffer of the receiver 150 may overflow, and the network may suffer an excessive delay and packet loss.

To control the congestion state, the receiver 150 sets a congestion control duration field (hereinafter referred to as a "duration field" for short) value using the channel reservation according to an exemplary embodiment of the present invention. The receiver 150 transmits a CTS frame with the set duration field value to the sender 100. In response, to the CTS frame, the sender 100 retransmits the RTS frame at the time indicated by the value of the duration field, delaying data transmission. Also, the congestion state information is broadcast to neighboring nodes by the CTS frame transmitted by the receiver 150. In this manner, the neighboring nodes recognize that the receiver 150 is in the congestion state, and can help the receiver 150 overcome the congestion state.

A format of the CTS frame will now be described below with reference to FIGS. 2A to 2D. FIGS. 2A to 2D illustrate formats of a Frame Control field 210, a Duration field 220, and a Subtype 230 of a CTS frame 200 used in an exemplary embodiment of the present invention. A detailed description of their operations will be made with reference to FIGS. 3 to 6.

Figure 2A:
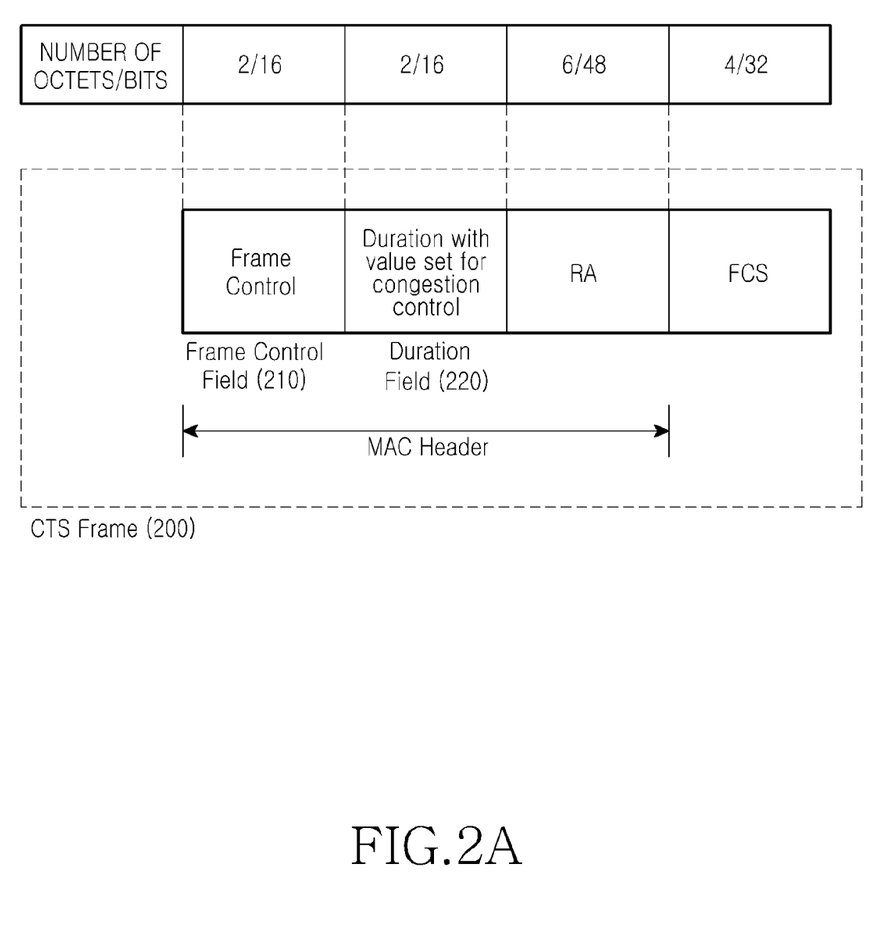
FIG. 2A is a diagram illustrating an exemplary format of a CTS frame according to an exemplary embodiment of the present invention.

FIG. 2A is a diagram illustrating an exemplary format of a CTS frame according to an exemplary embodiment of the present invention. A CTS frame 200 roughly includes a Frame Control field 210, a Duration field 220, a RA (Receiver Address) field and an FCS field. The CTS frame 200 is transmitted from a receiver 150 to a sender 100. The CTS frame 200 has a duration field 220 which can be used to indicate the congestion state of the receiver 150. The Frame Control field 210 includes a Subtype 230 therein. A method for analyzing the value of the Duration field 220 differs according to a value of the Subtype 230. The Duration field 220 is used for reserving the channel for the sender and receiver to communicate with each other and, in this present invention, it is also used for indicating whether and when the sender should retransmit the RTS to obtain the channel access.

Figure 2B:
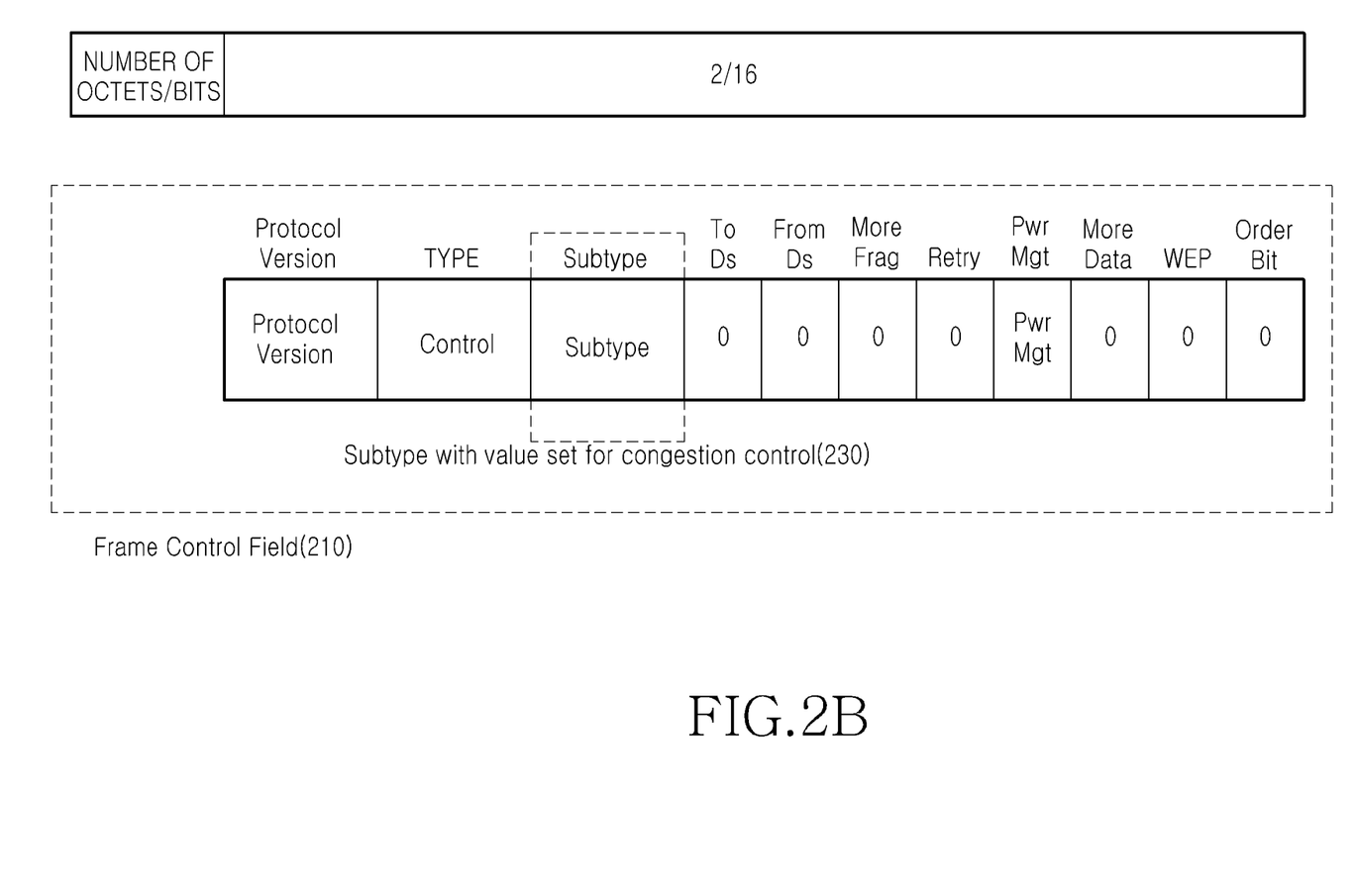
FIG. 2B is a diagram illustrating an exemplary format of a Frame Control field in a CTS frame according to an exemplary embodiment of the present invention.

FIG. 2B is a diagram illustrating an exemplary format of a Frame Control field in a CTS frame according to an exemplary embodiment of the present invention. In the second exemplary embodiment of the present invention, a receiver 150 sets "1100", "1101", "1110" or "1111" in the Subtype 230, and transmits the CTS frame to a sender 100 along with the set Subtype 230. Then the sender 100 waits for RTS retransmission for micro seconds corresponding to a value of a Duration field 220.

Figure 2C:
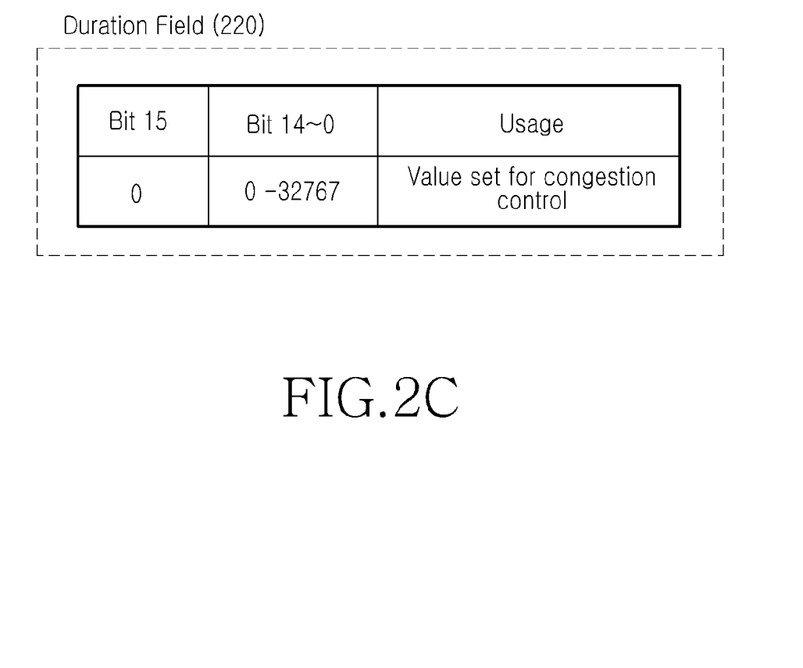
FIG. 2C is a diagram illustrating an exemplary Duration field value of a CTS frame according to an exemplary embodiment of the present invention.

FIG. 2C is a diagram illustrating an exemplary Duration field value of a CTS frame according to an exemplary embodiment of the present invention. In the first exemplary embodiment of the present invention, a receiver 150 sets a negative number in a CTS frame as a value of a Duration field 220, and transmits the CTS frame to a sender 100. Then the sender 100 waits for RTS retransmission for a period of micro seconds corresponding to an absolute value of the set Duration field 220. In the second exemplary embodiment of the present invention, the receiver 150 sets a value of a Subtype 230 to an unused value (as shown in FIG. 2B). For example, the receiver 150 sets a value of a Subtype 230 to 1100 (or one from 1100 to 1111), and transmits the CTS frame to the sender 100. In response, the sender 100 waits for retransmission of the RTS frame for a period of micro seconds corresponding to a value of the Duration field 220. This corresponds to the case in which the Subtype 230 is set in a different manner so a value of the Duration field 220 is analyzed in a manner different from the conventional method. In the third exemplary embodiment of the present invention, the receiver 150 sets a value of the Duration field 220 to '0', and transmits the CTS frame to the sender 100 along with the set Duration field 220. In response, the sender 100 retransmits the RTS frame after waiting for a predetermined time, or retransmits the RTS frame until the time arrives at dot11ShortRetryLimit.

Figure 2D:
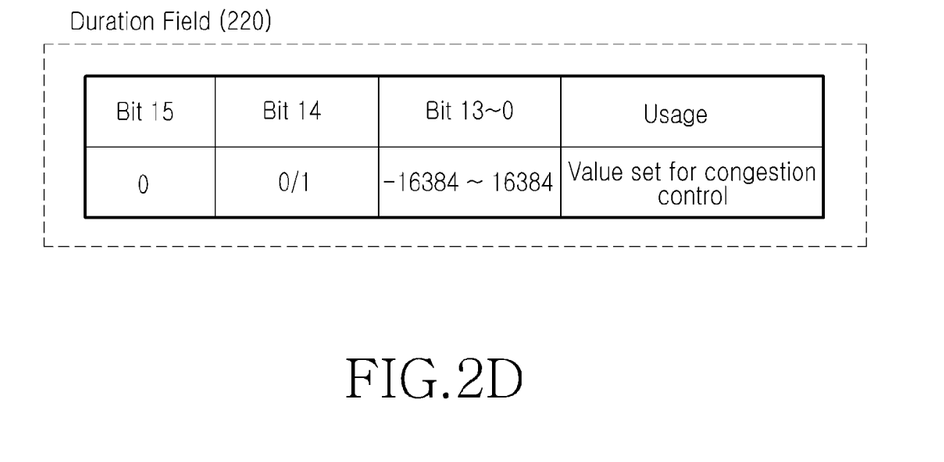
FIG. 2D is a diagram illustrating an exemplary case in which a Duration field value of a CTS frame is set to a negative number according to an exemplary embodiment of the present invention.

FIG. 2D is a diagram illustrating an exemplary case in which a Duration field value of a CTS frame is set to a negative number according to an exemplary embodiment of the present invention. In the first exemplary embodiment of the present invention, a receiver 150 sets a negative number in a CTS frame as a value of a Duration field 220 if congestion is detected in it neighborhood, and transmits the CTS frame to a sender 100. Then the sender 100 waits for RTS retransmission for a period of micro seconds corresponding to an absolute value of the set Duration field 220. When no congestion is detected, the receiver 150 can send a positive value of the Duration field 220 so that the sender can transmit the data packet for the number of microseconds indicated in the Duration field 220. Note when Bit 14 is set to 0, it indicates Bit 13~0 is a negative value; when it is set to 1, it indicates Bit 13~0 is a positive value.

First Embodiment

Figure 3:
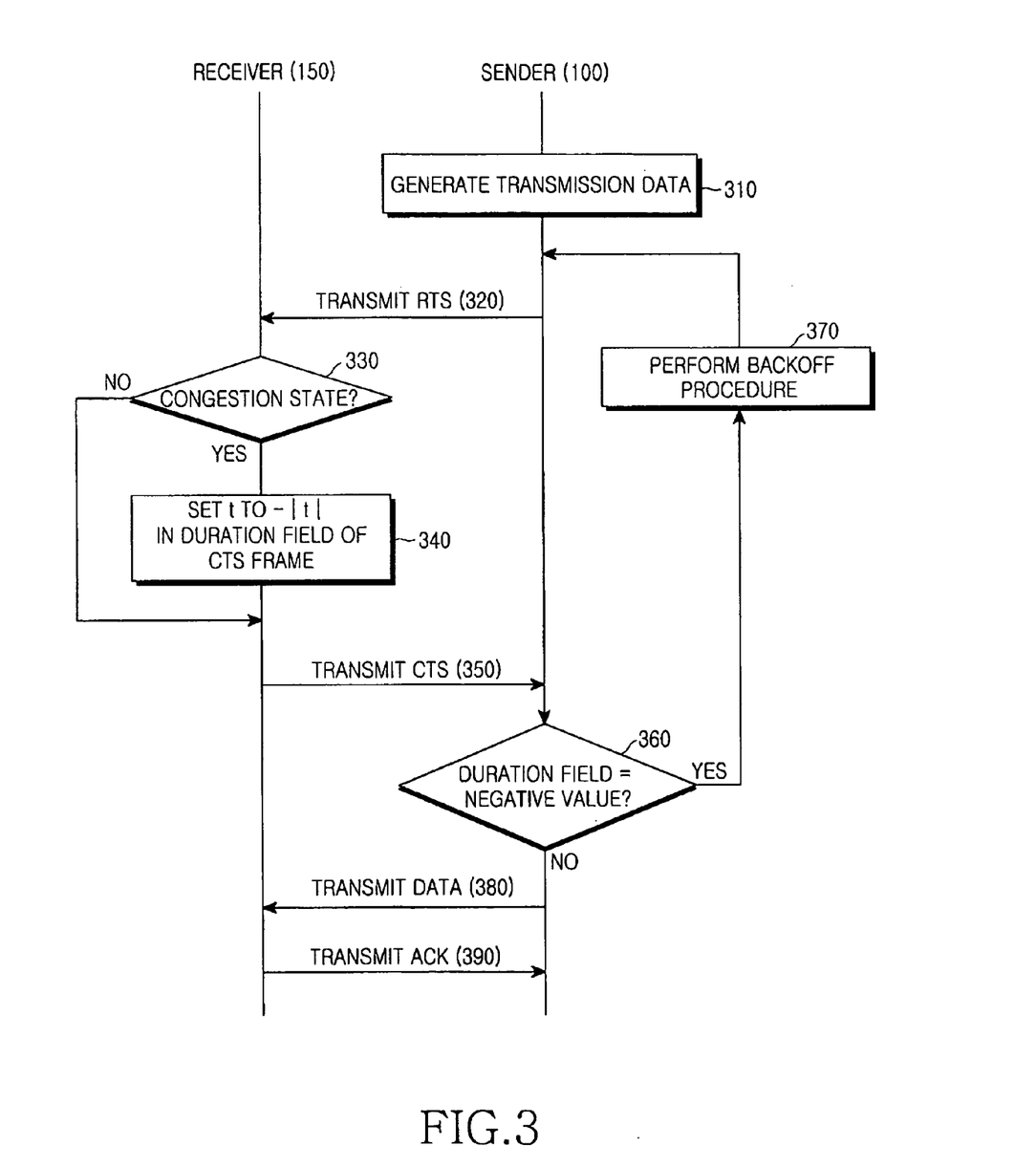
FIG. 3 is a flowchart of a congestion control system using a process of setting a duration field value to a negative value according to a first exemplary embodiment of the present invention.

With reference to FIG. 3, a description will now be made of a congestion control system and method for wireless mesh networks according to the first exemplary embodiment of the present invention. In the first exemplary embodiment of the present invention, a receiver 150 sets a negative value of the Duration field 220 in a CTS frame, and transmits the CTS frame to a sender 100, thereby rejecting an RTS when congestion is detected. An exemplary embodiment of the present invention changes the existing range of the value of the Duration field 220 so that a negative value may be permitted for it. As shown in FIG. 2D, a value of the Duration field 220 according to an exemplary embodiment of the present invention has 15 binary numbers (Bit 14 to Bit 0) in which Bit 14 is used to indicate whether the value from Bit 13 to Bit 0 is a positive value (Bit 14 set to 1) or a negative value (Bit 14 set to 0). This Duration field value can be expressed with 16383 to 16383. For congestion control, the receiver 150 sets a value from 16383 to −1 for bit 13 to bit 0 in the Duration field 220. The receiver 150 transmits the CTS frame with the set Duration field value to the sender 100. Then the sender 100 receives the CTS frame, and waits for retransmission of the RTS frame for micro seconds corresponding to its absolute value. The micro seconds corresponding to the absolute value may be set to a different value based on an appropriate waiting time period for congestion control. Upon receiving the Duration field 220 whose value is set to a negative number, the sender 100 recognizes a congestion state. The neighboring nodes, receiving the broadcast CTS frame, update a NAV to reduce the congestion of the receiver 150.

FIG. 3 is a flowchart of a congestion control system using a process of setting a value of a Duration field 220 to a negative value according to the first exemplary embodiment of the present invention. If there is transmission data in step 310, a sender 100 transmits an RTS frame to a receiver 150 in step 320. The receiver 150 receives the RTS frame and determines in step 330 whether its current state is a congestion state. The receiver 150 sets a time t, for which it will receive the retransmitted RTS frame, to −|t|, in the Duration field 220 of a CTS frame in step 340, only when its current state is the congestion state. The receiver 150 transmits the CTS frame to the sender 100 in step 350. Upon receiving the CTS frame, the sender 100 determines in step 360 whether a Duration field value of the CTS frame is a negative value. The sender 100 retransmits the RTS frame to the receiver 150 after waiting for |t| in step 370, only when the Duration field value is a negative value. If the value of the Duration field 220 is not a negative value, the sender 100 transmits data to the receiver 150 in step 380. In response to this transmission, the receiver 150 transmits an ACK to the sender 100 in step 390.

In the first exemplary embodiment of the present invention, the receiver 150 sets a negative value as a Duration field value of the CTS frame. After the sender 100 receives the CTS frame, the sender waits for retransmission of the RTS frame for a time corresponding to an absolute value of the Duration field 220. The typical corresponding time can be set to a period of micro seconds corresponding to the absolute value. The retransmission of the RTS frame means that the receiver 150 is not ready for transmission. Therefore, the neighboring nodes receiving the CTS frame recognize that the receiver 150 is in the state in which packets cannot currently be received.

The first exemplary embodiment of the present invention is characterized as follows. According to an exemplary implementation, a correct time value can be written in the Duration field 220. Use of the CTS frame solves the problem of controlling congestion only at the periodically determined time like the beacon frame. While the ACK is transmitted only from the receiver 150 to the sender 100, the CTS frame indicating the congestion is broadcast. This facilitates the participation of all of the neighboring nodes in the congestion control. Since the additional control frame necessary for the congestion control is not used, a load for the congestion control is reduced. Therefore, efficiency of data transmission increases because only the existing CTS frame is used for the congestion control.

Second Embodiment

Figure 4:
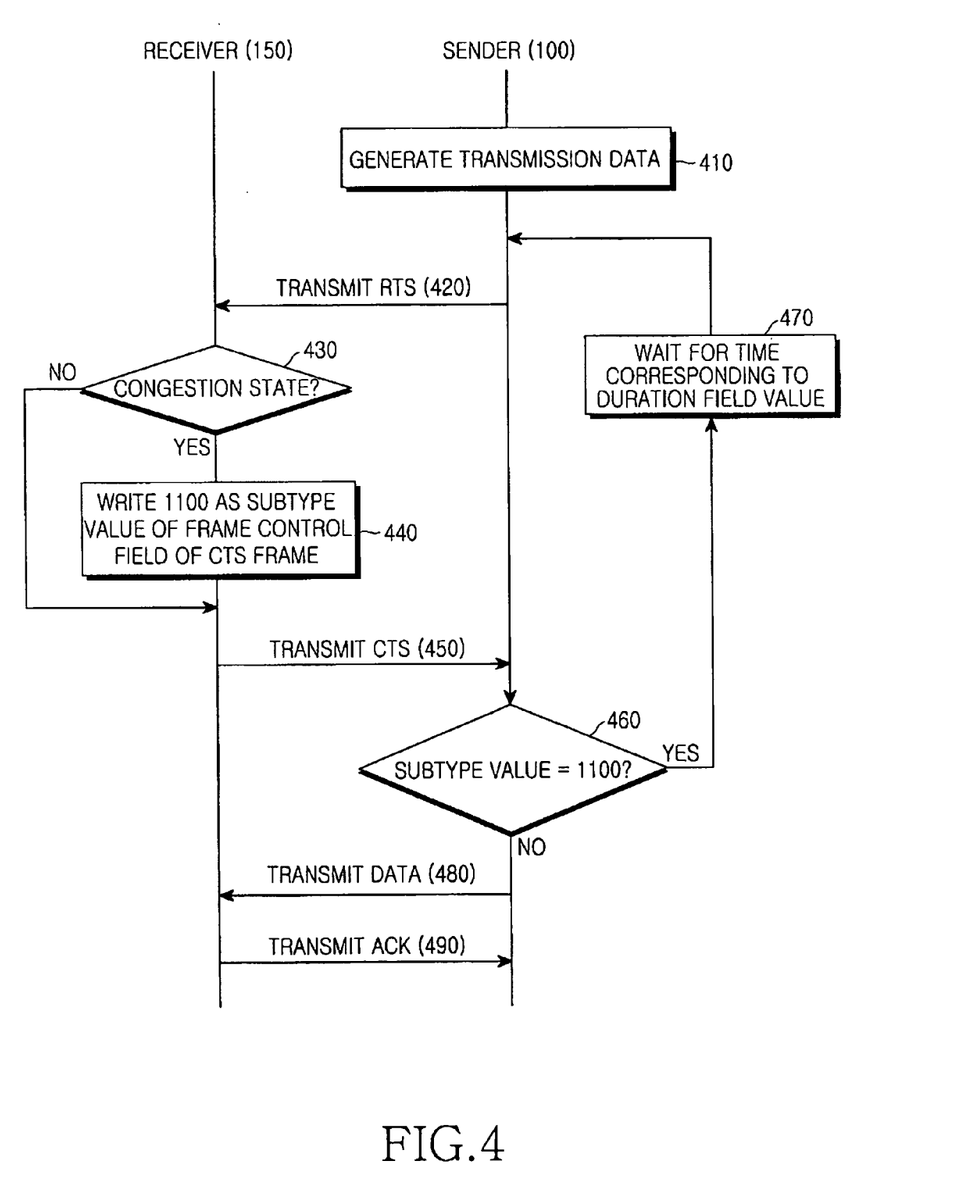
FIG. 4 is a flowchart of a congestion control system using an NCTS according to a second exemplary embodiment of the present invention.

With reference to FIG. 4, a description will now be made of a congestion control system and method for wireless mesh networks according to the second exemplary embodiment of the present invention.

In the second exemplary embodiment of the present invention, a receiver 150 transmits a Negative Clear-To-Send (NCTS) frame to a sender 100 to reject an RTS frame. Specifically, the receiver 150 sets a Subtype 230 of a Frame Control field 210 in a CTS frame 200 in a different manner. The Subtype 230 is set so that it is analyzed as an RTS retransmission waiting time period when the sender 100 analyzes a Duration field 220. Upon receipt of the CTS frame 200 with the set Subtype 230, the sender 100 waits for RTS retransmission for a time corresponding to a value of the Duration field 220. The Subtype 230 is expressed with a 4-digit binary number. The possible binary number for the Subtype 230 includes 1100, 1101, 1110, and 1111. When the Subtype 230 is set to any one of these pre-selected binary numbers, the CTS frame 200 functions as an NCTS frame. That is, the CTS frame 200 serves to deliver an NCTS indicating that the receiver 150 is not ready to receive packets from sender 100. If the receiver 150 transmits the NCTS frame to the sender 100, the sender 100 identifies the NCTS frame by checking the Subtype 230. As a result, the sender 100 retransmits the RTS frame to the receiver 150 after waiting for the time period corresponding to a value of the Duration field 220.

FIG. 4 is a flowchart of a congestion control system using an NCTS according to the second exemplary embodiment of the present invention. If transmission data is generated in step 410, a sender 100 transmits an RTS frame to a receiver 150 in step 420. In response thereto, the receiver 150 makes a determination in step 430 as to whether its current state is a congestion state. The receiver 150 sets an unused binary value, for example, 1100 (or one from 1100 to 1111), as a value of a Subtype 230 of a Frame Control field 210 in a CTS frame 200 in step 440, only when its current state is the congestion state. As the value of the Subtype 230 is set to an unused value, for example, 1100, a use of the CTS frame 200 is changed. That is, the CTS frame 200 is used for delivering the information on NCTS and not on CTS. The receiver 150 transmits the CTS frame 200 to the sender 100 in step 450. In step 460, the sender 100 checks a value of a Subtype 230 in a Frame Control field 210 of the received CTS frame 200 and determines whether the value of the Subtype 230 is '1100'. The sender 100 only waits for a time period corresponding to a value of a Duration field 220 in step 470 when the value of the Subtype 230 is '1100'. The value of the Duration field 220 can represent a value of 0 to 32767. If this value is defined as t, the typical corresponding time period can be t micro seconds. The receiver 150 then retransmits the RTS frame, and the receiver 150 and the sender 100 repeat the full process. If the value of the Subtype 230 is not '1100', the sender 100 transmits data to the receiver 150 in step 480. In response, the receiver 150 transmits an ACK to the sender 100 in step 490.

In the second exemplary embodiment of the present invention, the Subtype 230 is written as 1100, 1101, 1110 or 1111. If the receiver 150 sets the Subtype 230 and transmits an NCTS frame to the sender 100, the sender 100 waits for retransmission of the RTS frame for a time period corresponding to a value of the Duration field 220. Meanwhile, the neighboring nodes receiving the NCTS frame perceive that the receiver 150 is in the state in which it cannot currently receive packets.

The second exemplary embodiment of the present invention is characterized as follows. According to an exemplary implementation, a correct value can be written in the Duration field 220, and the congestion can be controlled using only the NCTS frame. The use of the NCTS frame can solve the problem that the congestion was controlled only at the periodically determined time period such as the beacon frame. Since the NCTS frame indicating the congestion is broadcast, all of the neighboring nodes can participate in the congestion control.

Third Embodiment

Figure 5:
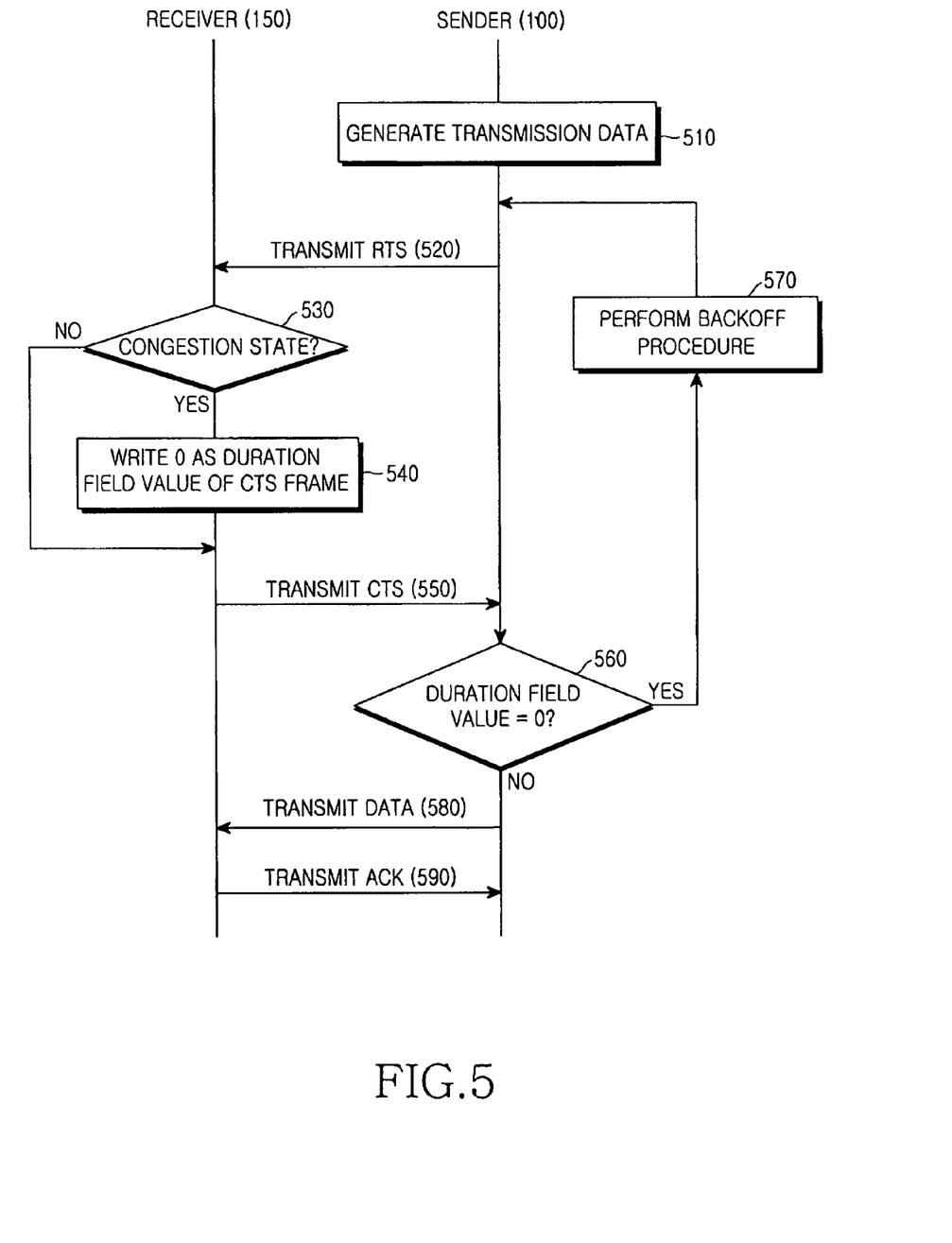
FIG. 5 is a flowchart of a congestion control system using a process of setting a duration field value to '0' according to a third exemplary embodiment of the present invention.

With reference to FIG. 5, a description will now be made of a congestion control system for wireless mesh networks according to the third exemplary embodiment of the present invention.

In the third exemplary embodiment of the claimed invention, a receiver 150 sets a value of a Duration field 220 to '0', and transmits a CTS frame with the set Duration field 220 to a sender 100. An operation for the case in which the value of the Duration field 220 is set to '0' has not previously been considered. Therefore, upon receiving the CTS frame with the Duration field 220 set to '0', the sender 100 retransmits an RTS frame without transmitting data. As a result, a congestion state of the receiver 150 can be controlled. This is because the receiver 150 re-receives the RTS frame without receiving actual data. Specifically, if a value of the Duration field 220 is '0' and this value is not explicitly analyzed, the sender 100 determines whether dot11ShortRetryLimit is identical to the number of RTS transmissions. If they are not identical to each other, the sender 100 retransmits the RTS frame. Alternatively, if they are identical to each other, the sender transmits the actual data.

Meanwhile, it can be defined that the sender 100 should wait for RTS retransmission for a predetermined time for the case in which the value of the Duration field 220 is '0'. In this case, the sender 100 retransmits the RTS frame to the receiver 150 after waiting for a predetermined time. The predetermined time can be set to a constant, can be randomly set, and can be set to a variable determined by taking the circumstances into consideration. In this case, upon receipt of the CTS frame from the receiver 150, the sender 100 retransmits the RTS frame to the receiver 150 after waiting for the predetermined time.

FIG. 5 is a flowchart of a congestion control system using a process of setting a value of a Duration field 220 to '0' according to the third exemplary embodiment of the present invention. If there is transmission data in step 510, a sender 100 transmits an RTS frame to a receiver 150 in step 520. Upon receiving the RTS frame, the receiver 150 determines whether its current state is a congestion state in step 530. The receiver 150 writes '0' in the Duration field 220 of a CTS frame 200 in step 540, only when its current state is the congestion state. The receiver 150 transmits the CTS frame to the sender 100 in step 550. Upon receiving the CTS frame, the sender 100 determines whether a value of the Duration field 220 in the CTS frame is '0' in step 560. If the value of the Duration field 220 is '0', the sender 100 waits for a predetermined time. Herein, if the value of the Duration field 200 is '0' and it is set such that a backoff procedure is waited for a predetermined time, then the sender 100 retransmits the RTS frame after waiting for the predetermined time. Alternatively, if the value of the Duration field 220 is not '0', the sender 100 transmits data to the receiver 150 in step 580. In response, the receiver 150 transmits an ACK to the sender 100 in step 590.

In the third exemplary embodiment of the present invention, the receiver sets a value of the Duration field 220 to '0', and transmits a CTS frame in which '0' is written in the Duration field 220, to the sender 100. Then the sender 100 retransmits the RTS frame without transmitting data. This is equivalent to controlling the congestion.

The third exemplary embodiment of the present invention is characterized as follows. First, when the value of the Duration field 220 is '0', waiting for a predetermined time period occurs before retransmission of the RTS frame can be set to a constant value, a random value, or a variable value. Second, the use of the CTS frame can solve the problem of controlling congestion only at the periodically determined time like the beacon frame. Third, because the CTS frame indicating the congestion is broadcast, all of the neighboring nodes can participate in the congestion control. Fourth, because the additional control frame necessary for the congestion control is not used, a load for the congestion control is reduced.

Fourth Embodiment

Figure 6:
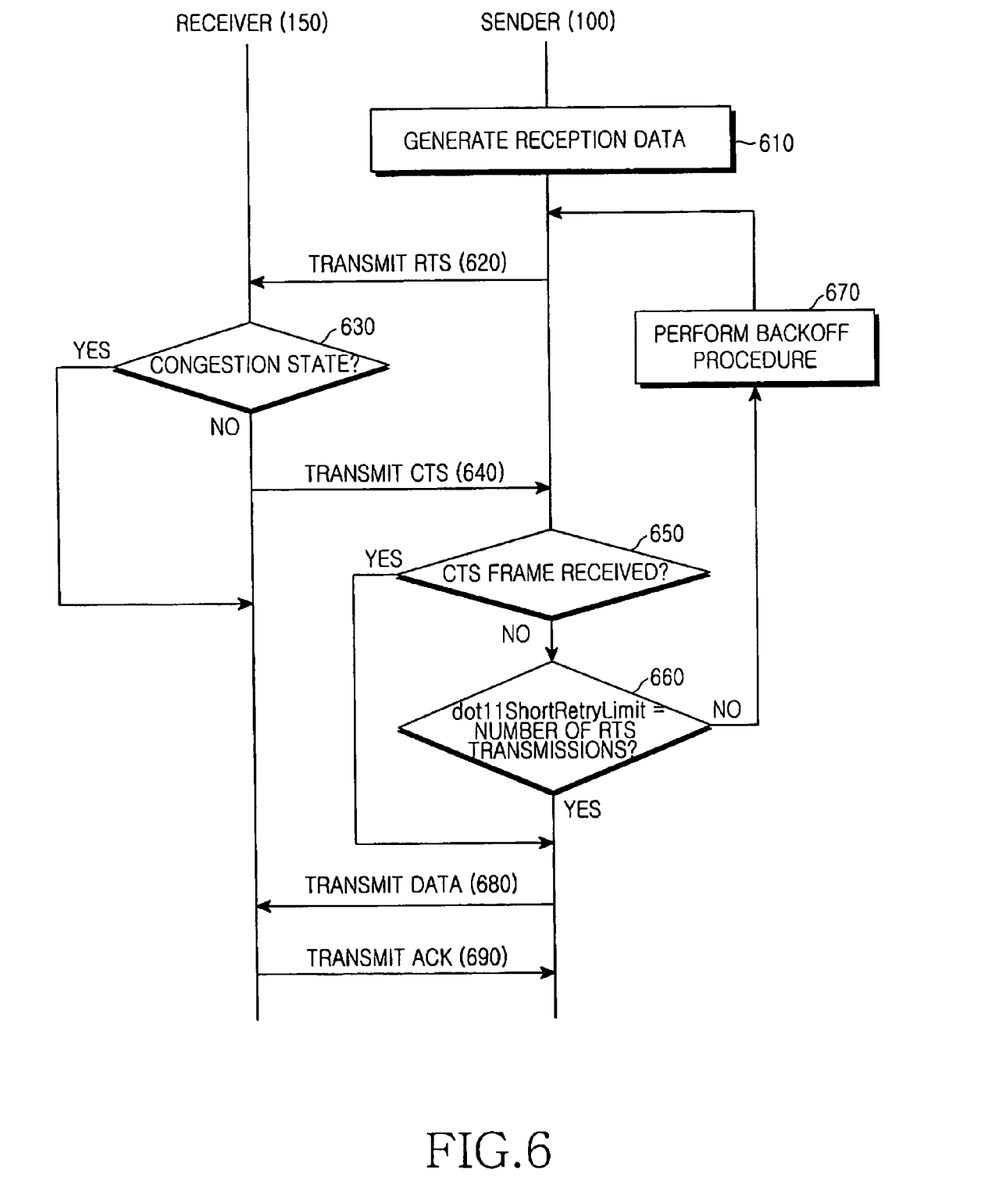
FIG. 6 is a flowchart of a congestion control system using a process of not transmitting CTS frame according to a fourth exemplary embodiment of the present invention.

With reference to FIG. 6, a description will now be made of a congestion control system for wireless mesh networks according to the fourth exemplary embodiment of the present invention.

In the fourth exemplary embodiment of the present invention, a receiver 150 rejects an RTS frame by not transmitting a CTS frame. In this case, the receiver 150 does not transmit a CTS frame. Then the sender 100 determines that the receiver is busy or a CTS/RTS frame is lost. Therefore, the sender 100 retransmits the RTS frame until the number of transmissions for the RTS frame is equal to a value dot11ShortRetryLimit. The neighboring nodes of the sender 100 update their NAVs according to the RTS frame. In this manner, even when the receiver 150 does not transmit a CTS frame, the congestion control can be performed. The fourth exemplary embodiment of the present invention will be described below with reference to FIG. 6.

FIG. 6 is a flowchart of a congestion control system using a process of not transmitting a CTS frame according to the fourth exemplary embodiment of the present invention. If reception data is generated in step 610, a sender 100 transmits an RTS frame to a receiver 150 in step 620. Upon receipt of the RTS frame, the receiver 150 determines in step 630 whether its current state is a congestion state. The receiver 150 transmits a CTS frame 200 to the sender in step 640, only when its current state is not the congestion state. The sender 100 determines in step 650 whether there is any CTS frame received from the receiver 150. Upon failure to receive a CTS frame, the sender 100 determines in step 660 whether a value dot11ShortRetryLimit is identical to the number of transmissions for the RTS frame.

If the value dot11ShortRetryLimit is not identical to the number of transmissions for the RTS frame, the sender 100 performs a backoff procedure in step 670. In the backoff procedure, the sender 100 can transmit no RTS frame for a random time. Alternatively, upon receipt of the CTS frame in step 650, the sender 100 transmits data to the receiver 150 in step 680. In response, the receiver 150 transmits an ACK to the sender 100 in step 690.

In the fourth exemplary embodiment of the present invention, the receiver 150 transmits no CTS frame to the sender 100. Then the sender 100 retransmits the RTS frame without transmitting data to the receiver 150, thereby performing the congestion control.

The fourth exemplary embodiment of the present invention is characterized as follows. First, if the receiver 150 transmits no CTS frame, it re-receives the RTS frame and not the data, so it can overcome the congestion. Second, because the additional control frame necessary for the congestion control is not used, a load for the congestion control is reduced.

As can be understood from the foregoing description, an exemplary embodiment of the present invention uses a Duration field, so the receiver receives an RTS frame without receiving data, thereby controlling the congestion.

Also, an exemplary embodiment of the present invention facilitates congestion control using a CTS frame, thereby increasing network efficiency, receiving congestion control from all nodes, and immediately coping with the congestion state.

While the present invention has been shown and described with reference to certain referred embodiment thereof, it will be understood by those skilled in the art that various changes in form and details may be made therein without departing from the spirit and scope of the invention as defined by the appended claims and their equivalents.

What is claimed is:

1. A method of a receiver for controlling congestion in a wireless mesh network, the method comprising:
    determining whether the receiver is in a congestion state that corresponds to a state in which an incoming packet rate at the receiver is higher than an outgoing packet rate at the receiver; and
    transmitting, to one or more neighboring nodes, a frame with a duration field value that indicates the congestion status of the receiver,
    wherein if the congestion status indicates a state of congestion, the frame further comprises a duration of the state of congestion in the duration field.

2. The method of claim 1, wherein the receiver receives data from at least one of the neighboring nodes after an amount of time corresponding to the duration indicated by the duration field value.

3. The method of claim 1, wherein the frame comprises a Clear-to-Send (CTS) frame that is transmitted in response to receiving a Request-to-Send (RTS) frame from a sender.

4. A system for controlling congestion in a wireless mesh network, the system comprising:
- a sender; and
- a receiver for determining whether the receiver is in a congestion state that corresponds to a state in which an incoming packet rate at the receiver is higher than an outgoing packet rate at the receiver, and for transmitting, to neighboring nodes, a frame with a duration field value that indicates the congestion status of the receiver,
- wherein if the congestion status indicates a state of congestion, the frame further comprises a duration of the state of congestion in the duration field.

5. The system of claim 4, wherein upon receipt of the frame from the receiver, the sender transmits data to the receiver after waiting for an amount of time corresponding to the duration indicated by the duration field value.

6. The system of claim 4, wherein the frame comprises a Clear-to-Send (CTS) frame that is transmitted in response to receiving a Request-to-Send (RTS) frame from the sender.

7. A method of a sender for controlling congestion in a wireless mesh network, the method comprising:
- receiving, from a receiver, a frame with a duration field value that indicates a congestion status of the receiver, wherein the congestion status indicates whether the receiver is in a congestion state that corresponds to a state in which an incoming packet rate at the receiver is higher than an outgoing packet rate at the receiver, and if the congestion status indicates a state of congestion the frame further comprises a duration of the state of congestion in the duration field; and
- if data transmission is determined, transmitting data to the receiver after waiting for an amount of time corresponding to the duration indicated by the duration field value.

8. The method of claim 7, wherein the frame comprises a Clear-to-Send (CTS) frame that is transmitted in response to receiving a Request-to-Send (RTS) frame from the sender.

* * * * *